Figure 1:
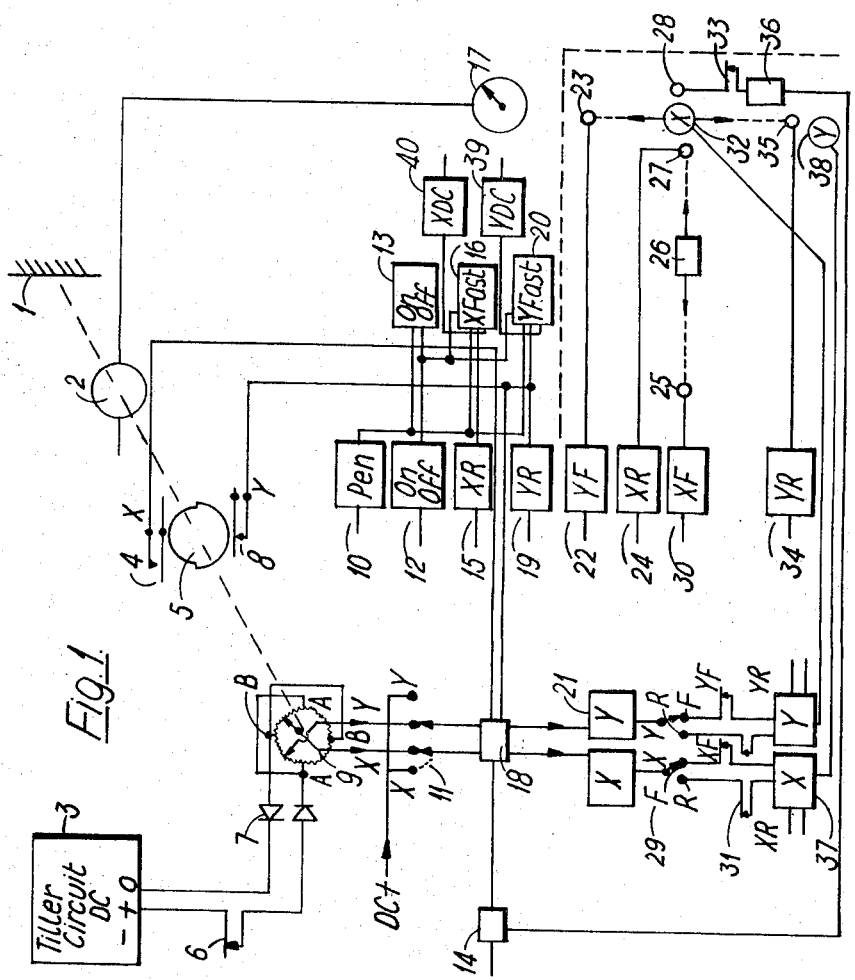

United States Patent [19]

Duval

[11] 3,763,304

[45] Oct. 2, 1973

[54] SAILING SIMULATOR PROVIDING VISUAL INDICATION OF PERFORMANCE

[75] Inventor: Bruce Duval, Nassau, Bahamas

[73] Assignee: T.P.I. Limited, Nassau, Bahamas

[22] Filed: Jan. 14, 1972

[21] Appl. No.: 217,794

[52] U.S. Cl.................... 35/10.2, 35/11, 235/184, 346/8
[51] Int. Cl............................................. G06b 9/06
[58] Field of Search................. 35/10.2, 11, 12 E, 35/12 W, 12 N, 12 P; 346/8, 29

[56] References Cited
UNITED STATES PATENTS

| | | | |
|---|---|---|---|
| 3,544,692 | 12/1970 | Frasca | 35/10.2 |
| 3,378,938 | 4/1968 | Frasca | 35/12 W |
| 3,325,822 | 6/1967 | Heggen et al. | 346/8 R |
| 3,624,370 | 11/1971 | Gray, Jr. | 346/29 |
| 3,597,856 | 8/1971 | Waddington | 35/11 |

*Primary Examiner*—Felix D. Gruber
*Attorney*—Jacobs & Jacobs

[57] ABSTRACT

A sailing simulator of the kind having a helm operable by a pupil to provide a visual simulation of the steering movement of a sailing craft being sailed by the pupil in a supposed wind, has a coordinate generator operable to generate coordinates representing the supposed position of the sailing craft at different times, and a plotting device for plotting the coordinates to provide a visual record of the supposed track sailed by the pupil. The coordinate generator may be an electrical or mechanical integrator responsive to velocity and direction signals.

Advantageously the plotting device is fitted to a chart board on the simulator for observation by the pupil. Charts for receiving the plot may carry printed instructions for a lesson, and arrangements may be made so that fitting the chart automatically programs the simulator with steady or variable wind conditions appropriate for the lesson.

11 Claims, 8 Drawing Figures

SAILING SIMULATOR PROVIDING VISUAL INDICATION OF PERFORMANCE

The present invention relates in one aspect thereof to training devices and has as a primary object the provision of a training device in a new and improved form.

The invention also relates in another aspect thereof to track plotting apparatus employable to provide a visual record of a track which may be the supposed track travelled by a pupil operating a sail training device or other vehicle simulator of the static type or which may be an actual track travelled by a vehicle, e.g., a land vehicle.

A simple form of sail training device has a helm operable by a pupil to produce a visual simulation of the steering movement of a sailing craft being sailed by the pupil in a supposed wind. The visual simulation of the steering movement may be provided by arranging that the heading of a hull unit, preferably a hull unit on which the helm is mounted, is moved in response to the helm. Alternatively the simulation may be provided by arranging that a display is moved around the pupil in response to the helm to give a similar visual effect; here again the helm is preferably mounted on a hull unit and in both cases the hull unit is preferably designed to carry the pupil, is mounted for heeling motion and provided with powered heeling means for driving it it the heeling motion. The value of a sail training device which makes no provision for demonstrating the heeling encountered in actual sailing is limited.

A practical form of sailing simulator is described in U.S. Pat. No. 3,471,943 and improvements applicable thereto are described in U.S. Pat. Nos. 3,457,783, 3,540,134, 3,531,875 and 3,597,856.

In accordance with the present invention there is provided a sailing simulator of the kind having a helm operable by a pupil to provide a visual simulation of the steering movement of a sailing craft being sailed by the pupil in a supposed wind (preferably a sailing simulator as described in U.S. Pat. No. 3,471,943 and advantageously also with improvements as aforesaid), a coordinate generator operable to generate coordinates representing the supposed positions of the sailing craft at different times and a plotting device for plotting the coordinates to provide a visual record of the supposed track sailed by the pupil.

The coordinate generator is preferably constituted to generate the coordinates substantially continuously so that the visual record is continuous rather than a plot of a discrete series of positions. The plotting device is preferably constituted to plot the coordinates, e.g., by means of a stylus, to provide a permanent record. It is however within the scope of the invention to employ a temporary display device, for example a cathode ray tube or a matrix of electro-luminescent elements, arranged to provide a display only of the recent part of the track.

Cartesian coordinates which involve only distance, viz. integrated velocities in two fixed directions, are preferred to polar coordinates which involve a distance from and a bearing with respect to a fixed reference point. Thus the coordinate generator is preferably an integrator responsive to a velocity signal which represents the supposed velocity of the craft and to a direction signal which represents the supposed direction of travel of the craft. In a preferred arrangement, the coordinate generator is responsive to the direction signal to resolve the velocity signal into two components of fixed direction and to integrate the two components with respect to time to produce the coordinates. Conveniently the coordinate generator is responsive to direction and velocity signals of the analog type and is operable to yield the two components in digital form so that each integrated component consists of a train of pulses, the number of pulses in the train being proportional to the coordinate. The digital output is very convenient in practice, for the coordinate generator may be provided with a pair of stepping motors being operable to displace a track tracing stylus by a fixed amount on receipt of each pulse.

In a preferred arrangement, the coordinate generator is responsive to a velocity signal in the form of a voltage from a velocity function generator and to a mechanical direction sensor. It is a simple matter to resolve the velocity signal in the form of a voltage into two components by means of a sine function potentiometer system driven mechanically to set it for direction. It is also feasible to modify one or both of the components to represent the effect of drift on the track. In the present state of the art it is more convenient to process analog signals and to digitise them in their final form than to process digital signals.

A convenient form of plotting device has a carrier which is movable over a chart holder in the direction of one coordinate and a stylus mounting which is displaceable on the carrier in the direction of the other coordinate. For example the stylus mounting is mounted on the carrier in driven relationship with a lead screw extending in the direction of said one coordinate.

The most effective results are obtained by positioning the plotting device on a hull unit to be occupied by the pupil. The pupil is able to see a representation of his supposed course and the effect thereon of his manipulation of the tiller and other controls which may be provided. The chief requirement is that the representation seen by the pupil should be realistic in the sense that the pupil's actions produce changes of track which resemble those produced in actual sailing. This requirement is readily achieved. No high degree of precision is required because the actual sailing craft which pupils will eventually sail can be expected to differ among themselves, as well as from the simulator, in their sailing characteristics.

An art which can be practised on a sailing simulator is that of dealing with changing conditions of wind force and wind direction which can be represented by varying the appropriate inputs. The visual record provided by a simulator in accordance with the invention demonstrates to the pupil how effectively he can deal generally with changing conditions.

In a typical application of the invention for providing a visual record of the actual track travelled by a vehicle, the vehicle is provided with a coordinate generator and plotting device and with means for providing signals representing the velocity and direction of travel of the vehicle. With a wheeled vehicle a velocity signal is obtainable from a speedometer or other transducer driven by the transmission. A digital signal representing distance travelled is readily obtainable from the transmission, and such a digital signal may be processed to provide a (differentiated) analog output for use with the analog system herein described. A signal representing direction is obtainable from a compass. Useful results are obtainable with the apparatus even though it may not be designed to provide high precision or to maintain its precision over long periods of time. Normally the position of a land vehicle can be checked at frequent intervals from a map. A plot of the track is a useful aid to map reading and the determination of position by interpolation. To give improved plotting in undulating country, the velocity signal may be modified in response to a damped pendulum to generate its horizontal component.

The following description in which reference is made to the accompanying drawings is given in order to illustrate the invention.

Figure 2:
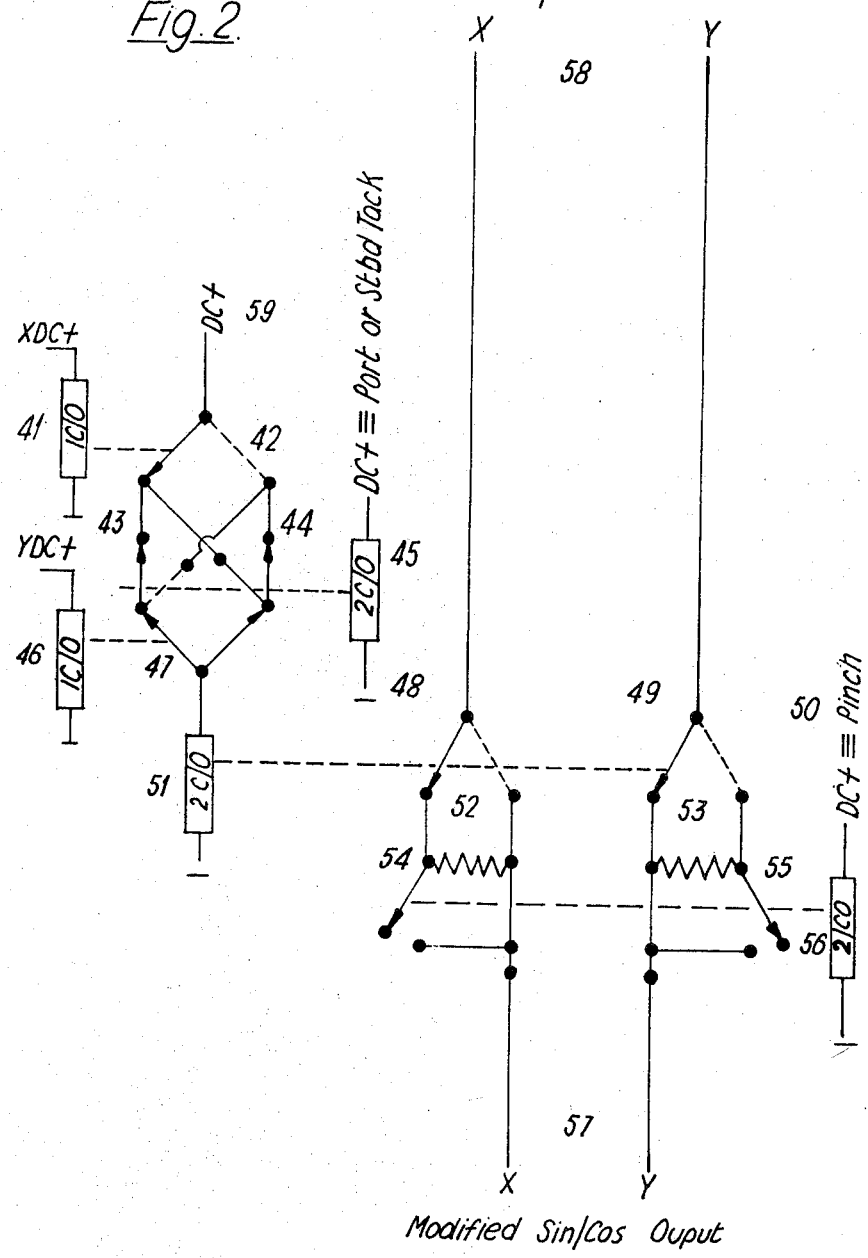
Figure 3:
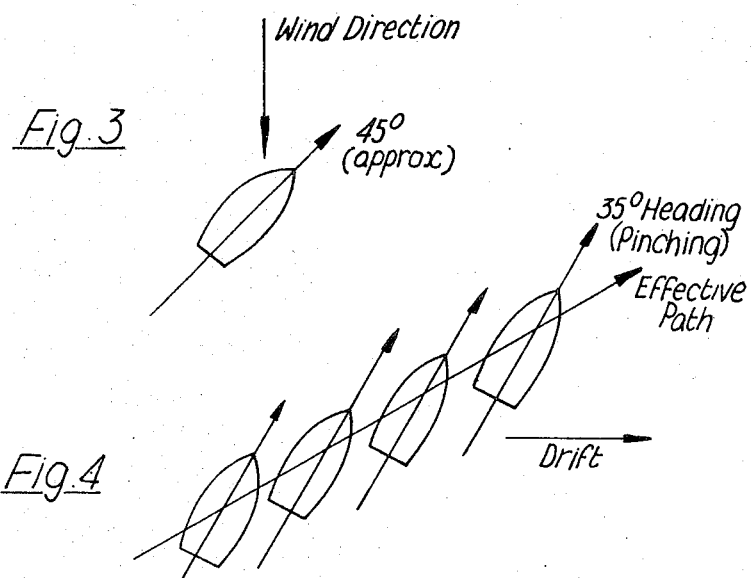
Figure 4:
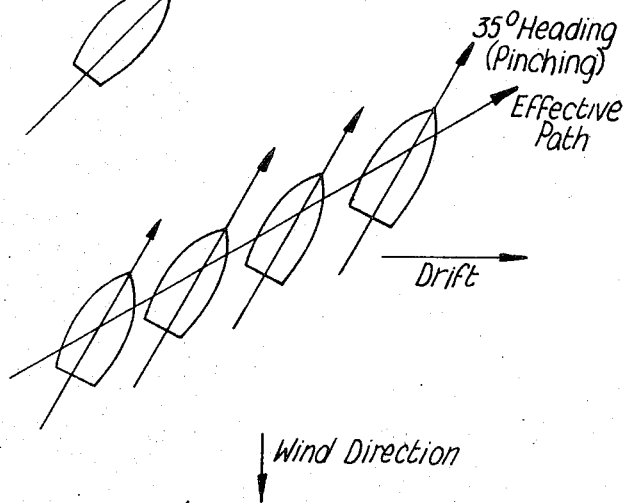
Figure 5:
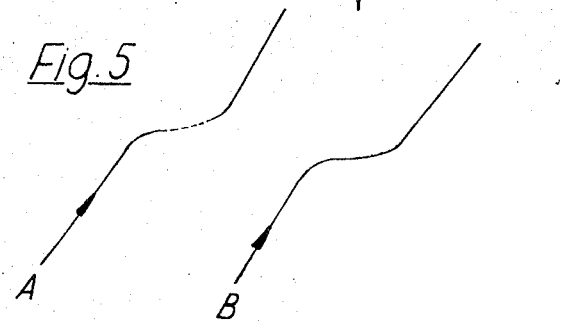
Figure 6:
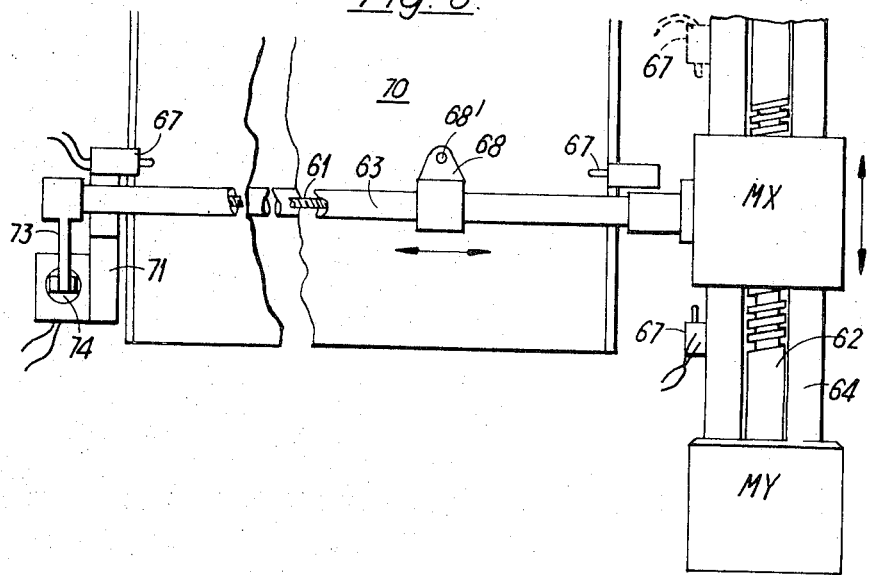
Figure 7:
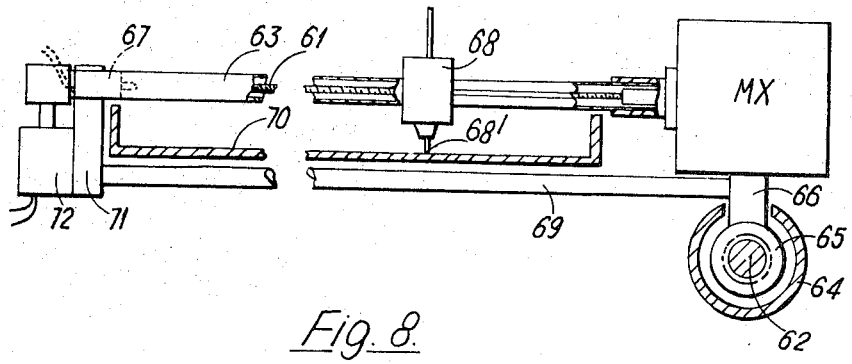
Figure 8:
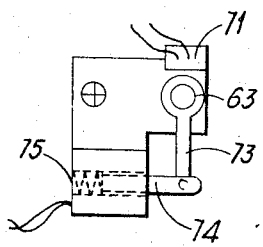

In the drawings:

FIG. 1 is a block diagram showing a coordinate generator and plotting device for use on a sail trainer, FIG. 2 shows a circuit for introducing the effect of leeway drift on a track produced by the apparatus of FIG. 1, FIGS. 3 and 4 respectively illustrate a vessel sailing close-hauled at approximately 45° to the wind, and a vessel pinched at about 35° to the wind, FIG. 5 shows two tracks with portions having temporary conditions of drift, FIGS. 6, 7 & 8 show in further detail the mechanical arrangement of the plotting device indicated in FIG. 1.

Referring to FIG. 1, 1 is a reference point from which direction is taken, for example the fixed base of the sailing simulator about which it turns. 9 is a fully rotary sine-cosine wound potentiometer with two wipers set at 90° with its winding tapped at four points 90° apart. One pair of tappings 9A, 180° apart is fed with a D.C. voltage supplied from unit 3 (via contact 6) which is a device such as that described in U.S. Pat. No. 3,693,264. The D.C. output from 3 represents the supposed speed of the craft through the water and varies from zero to a maximum according to how the simulator's sails are set and the relative angle between the hull and the assumed wind direction. The other pair of tappings 9B, 180° apart, is connected to the zero point relative to the D.C. voltage output of unit 3. The pair of diodes 7 ensures that reverse polarity voltages cannot be applied to this system. 11 X and Y are contacts operated by solenoid coils 40 and 39 respectively. 18 is a unit detailed in FIG. 2 which modifies the output from the sin/cos potentiometer 9 in such a way as to produce the effect of leeway drift. 14 is a unit which is operated by a wind direction resolving unit such as that described in U.S. Pat. No. 3,457,783. The unit 14 produces as one of its functions an output when the craft is sailed too close into the wind or "pinches," i.e., the jibsail flutters no matter how firmly it is sheeted in. 21 X and Y are analog to digital converters which produce a chain of pulses varying from zero to a maximum proportional to an applied voltage.

29 X and Y are contacts operated by solenoid coils 15 and 19 respectively. 31 XR, XF, YR & YF are contacts operated by solenoid coils 24, 30, 34 and 22 respectively. 37 X and Y are pulse shapers which convert the pulses from units 21 X and Y into the form, amplitude and width to suit the stepping motors 32 and 38. The Y stepping motor 38 drives a carrier for the X stepping motor 32 between the limit switches 23 and 35. The Y reverse limit 35, when contacted, operates the solenoid coil 34 which opens the contact 31 YR. The Y forward limit 23 when contacted operates the solenoid coil 22 which opens contact 31 YF.

The X stepping motor 32 which is driven between the limits 23 and 35 drives the pen carrier 26 between the limit switches 25 and 27. The X reverse limit 27, when contacted, operates solenoid coil 24 which opens contact 31 XR. The X forward limit 25 when contacted operates the solenoid coil 30 which opens contact 31 XF. The user is provided with control switches to allow him to bring the pen carrier 26 rapidly to any required position on the recording chart and a further switch to allow him to interrupt the movement of the pen carrier 26. The double-pole double-throw centre-off three-position switch 16 controls the rapid movement of the pen carrier 26 in the X direction. From the "off" position it can be moved to the X fast forward position when the contacts 29 XF remain closed as shown, the solenoid coil 12 is operated through opening the contact 6, the solenoid coil 10 is operated when opening the contact 33 so that the pen 26 is lifted off the chart and the solenoid coil 40 is operated so that the contact 11 X changes to the position in which it will receive a D.C. voltage at a level which drives the stepping motor 32 X rapidly to the desired position. Similarly the switch 16 can be moved to the X fast reverse position when solenoid coil 15 brings contact 29 to position XR. Other functions are as described above, i.e., 12 opens 6, 10 opens 33 and 40 connects 11 X to the D.C. for fast travel.

The Y motion is provided with an identical three-position switch 20 which controls the fast vertical motion of the pen carrier 26. In position Y fast forward 29 YF remains as shown. 12 opens 6, 10 opens 33 and 39 connects 11 Y to the D.C. for fast travel. Similarly in the Y fast reverse position solenoid coil 19 changes 29 Y to position R, 12 opens 6, 10 opens 33 and 39 changes 11 Y to D.C. for fast travel.

It should be appreciated that multi-pole relays are used in practice to prevent cross operation of individual controls.

As a further aid to the pupil a heading indicator 17, driven by the synchro-transmitter 2, is fitted either beside the course plotter or on the pen carrier 26 itself.

The motion of the pen carrier 26 follows the theoretical track of the simulator in the following manner. Assuming that the sails are correctly set there will be a + D.C. voltage applied to the sin/cos potentiometer 9 from the unit 3 which is split through the sine cosine windings of the potentiometer 9 into two via the two wipers at 90°. The winding of 9 is arranged so that each quadrant AB changes according to sine law relative to the angular displacement along its arc. In this way the pen is driven at the correct speed along the desired path. For example at 45° to vertical path on the chart (i.e., the Y motion) the Y motor will be driven by a factor of sin 45° (0.707) and the X motor will be driven by a factor cos 45° (0.707). Thus in a given time each axis will have been moved through 0.707 unit distance and the pen will be driven along a hypotenuse of unit length in the given time. As explained earlier, an elevated voltage can be injected by either or both of the changeover contacts 11 X and Y to bring a pen on carrier 26 rapidly to any desired position. The unit 18 shown in detail in FIG. 2 allows for the demonstration of leeway drift. Leeway drift always occurs to some extent when sailing close into the wind, e.g., at 35°, but this becomes excessive when the craft is pinched or headed too close into the wind — see FIGS. 3 and 4.

Referring to FIG. 2, 58 X and Y are sin/cos inputs to the circuit arriving from the potentiometer 9. The outputs 57 X and Y come from a logic circuit so that either or neither output arrives via one of the pairs of resistors 52 and 53. The contacts 48 and 49 decide in which circuit the resistance will be in the event of pinching and the contacts 54 and 55 only open when pinching occurs and are operated by the coil 56 which is energised by the input at 50 which comes from the switching logic unit 14. The logic switching which decides in which circuit the resistance is to be inserted is operated by the coils 41, 45 and 46. When the coil 51, which is supplied by input 59, is "on" the drift resistance is inserted in output X, and when pinching occurs, and when 51 is "off" the drift resistance is inserted in the Y output when pinching occurs.

Coils 41 and 46 operating contacts 42 and 47 respectively are on or off according to the direction in which each axis motor is driving the pen and the coil 45 operating 43 and 44 is on or off according to the track, thus ensuring that the drift corresponds with wind direction. The outputs from unit 18 provide inputs for the analog to digital units 21 which produce pulses of a frequency dependent on applied voltage. By means of the changeover switch contacts 29 the pulses enter either forward or reverse drive inputs of the shaping units 37. The contacts 31 are operated by limit switches. In order to clarify subsequent analysis of the trace, an interrupter unit 36 is inserted in the supply to the pen held on solenoid 28. When pinching and therefore leeway drift occurs the pen is lifted on and off at regular intervals thus producing a chain line instead of a continuous one. In this way on later examination of the trace it is possible to distinguish between leeway drift and a deliberate bearing-away.

FIG. 5 shows two tracks A and B under close-hauled conditions. Both show temporary drift conditions. In track A the section plotted in a broken line denotes drift caused by pinching. The section of corresponding shape in track B is produced by deliberate bearing away and is in the form of a continuous line.

As the simulator's heading is changed the cam 5 rotates and opens or closes switches 4 and 8 which control the reversing relays 15 and 19 respectively. The latter operate the contacts 29 X and Y.

The mechanical arrangement of the plotting device is shown in FIGS. 6, 7 and 8.

The two motors MX and MY are driven at speeds appropriate for the trace being generated. The motors each drive a lead screw 61 and 62 respectively having identical pitches, the lead screws being mounted to run in slotted tubes 63 and 64. The lead screw 62 is fitted with a nut 65 from which projects an arm 66 to carry the X axis assembly including motor MX. Limit switches 67 are provided for both axes.

The slotted tubes 63 of the X axis carries a pen fitting 68 which is driven by a pin engaging the lead screw 61. This assembly is made more rigid by the addition of a support arm 69 which is fitted below the writing table 70.

The slotted tube 63 is carried, at the other end remote from motor MX, by a bearing in an end plate 71 which also carries a solenoid 72. The tube end is fitted with a radius arm 73 linked to the armature 74 of the solenoid. The armature being loaded by a spring 75, biases the pen off or on to the writing surface according to whether the solenoid is energised or not.

When used to plot the assumed path of a craft the solenoid may be pulsed on and off so as to provide a broken line to indicate a certain state of affairs such as excess leeway drift — see FIG. 5.

The writing surface shown in FIGS. 6 and 7 is a holder for a chart. In a preferred arrangement (U.S. Pat. application Ser. No. 217,791 of Bruce Duval) the chart, which may bear printed instructions for a particular lesson, has an edge formed with cut-away portions or perforations. Micro switches positioned to be actuated by the edge of the chart are connected with apparatus for generating signals representing wind force and wind direction conditions — which may be steady or variable — for control systems of the simulator. Thus the pupil may be set a task and the simulator programmed to provide suitable conditions for that task simply by inserting a chart. The pupil's performance is recorded in the form of a track traced by the pen 68'.

If the plotting device is placed conveniently near the helm of the simulator, the trace enables the pupil to monitor his performance as well as providing a record for subsequent evaluation.

In a modified arrangement within the scope of the invention, a commercially available mechanical resolver, preferably a ball resolver is used in place of the digital device driving stepping motors, and the sine/cosine generators.

The ball resolver has a ball in frictional driving relationship with a pair of mutually perpendicular output discs $x$ and $y$ which bear against the ball, and in frictional driven relationship with an input disc $d$. This input disc is rotatable in a stirrup bearing about the axis in its own plane which intersects its own rotational axis and passes through its position of contact with the sphere.

With disc $d$ driven so that its peripheral speed represents the instantaneous supposed speed of the craft, whilst its position determined by the stirrup bearing represents the instantaneous supposed course, the discs $x$ and $y$ are driven to provide sine/cosine outputs, representing the X and Y components of the vector.

These outputs may be supplied electrically via synchro transmitters and receivers, or mechanically by shafting, to the lead screws 61 and 62 of the plotting device shown in FIGS. 6, 7 and 8. In either case gearboxes are employed to provide rates of revolution of the ball and discs consistent with good performance of the ball resolver.

I claim:

1. A sailing simulator of the kind having a helm operable by a pupil to provide a visual simulation of the changes of geographical heading of a sailing craft being sailed upon water by the pupil in a supposed wind having supposed instantaneous speed and supposed instantaneous geographical direction, a velocity signal generator providing a velocity output representing the supposed velocity of the simulator through the water as a function of said supposed instantaneous speed, and the relationship between said geographical heading and said supposed instantaneous geographical direction, a heading sensor providing a heading output representing geographical heading, a coordinate generator responsive to the velocity output of the velocity signal generator and the heading output of the heading sensor to generate coordinates representing the supposed positions of the sailing craft at different times, and a plotting device responsive to said coordinate generator to plot the coordinates and thereby provide a visual record of a supposed track sailed by the pupil in said supposed wind.

2. A simulator according to claim 1 in which the coordinate generator is constituted to generate the coordinates substantially continuously.

3. A simulator according to claim 2 in which the coordinates are Cartesian coordinates.

4. A simulator according to claim 1 in which the plotting device has a carrier which is movable over a chart holder in a direction corresponding with one coordinate and a stylus mounting which is displaceable on the carrier in a direction corresponding with the other coordinate.

5. A simulator according to claim 4 in which the carrier is provided with an actuator operable to move the stylus mounting to displace a stylus, when mounted thereby, towards and away from a position in which the stylus is in chart marking relationship with the chart holder.

6. A simulator according to claim 5 in which the carrier is rotatable by said actuator.

7. A simulator according to claim 4 in which the stylus mounting is mounted on the carrier in driven relationship with a lead screw extending in the direction of said one coordinate.

8. A simulator according to claim 5 having, for operating said actuator, an operating circuit providing an intermittent output for causing the stylus to trace a broken line when the relationship between velocity output, the geographical heading and the instantaneous geographical direction of the wind are such as to produce pinching in actual sailing upon water.

9. A simulator according to claim 1 in which the plotting device is provided with means for interrupting the visual record at rapid intervals when the pupil operates the craft to produce supposed pinching.

10. A sailing simulator of the kind having a helm, operable by a pupil to provide a visual simulation of the changes of geographical heading of a sailing craft being sailed upon water by the pupil in a supposed wind having suposed instantaneous speed and supposed instantaneous geographical direction, a velocity vector magnitude signal generator of the analog type providing an analog velocity vector magnitude output representing the supposed velocity of the simulator through the water as a function of said supposed instantaneous speed and the relationship between said heading and said supposed instantaneous geographical direction, a heading sensor of the analog type providing an analog heading output representing said geographical heading, said heading output being an analog velocity vector direction output, a vector resolving device operable to resolve the velocity vector represented by the vector magnitude, and vector direction, outputs into two velocity magnitude components, integrating apparatus arranged to receive the velocity magnitude components and integrate each of them with respect to time and a coordinate plotter responsive, at least periodically, to the integrated velocity magnitude components to plot said integrated components as coordinates and thereby provide a visual record of supposed track sailed by the pupil.

11. A simulator according to claim 10 wherein the coordinate plotter is driven by stepping motors, and the vector resolving device is provided with a converter for converting the velocity magnitude components to digital form, said stepping motors being responsive to the converted components.

* * * * *